United States Patent [19]

Drawert et al.

[11] Patent Number: 4,668,765

[45] Date of Patent: May 26, 1987

[54] POLYAMIDE RESIN FROM HYDROGENATED DIMERIZED FATTY ACID

[75] Inventors: Manfred Drawert, Froendenberg; Horst Krase, Hamm, both of Fed. Rep. of Germany

[73] Assignee: Schering AG, Berlin and Bergkamen, Fed. Rep. of Germany

[21] Appl. No.: 836,762

[22] Filed: Mar. 6, 1986

[30] Foreign Application Priority Data

Mar. 22, 1985 [DE] Fed. Rep. of Germany ....... 3510415

[51] Int. Cl.$^4$ ............................................. C08G 69/34
[52] U.S. Cl. ..................... 528/336; 106/27; 260/404.5; 427/256; 427/288; 528/339.3; 528/340; 528/345
[58] Field of Search ..................... 528/340, 336, 339.3, 528/345

[56] References Cited

U.S. PATENT DOCUMENTS

| | | | |
|---|---|---|---|
| 2,482,761 | 9/1949 | Goebel | 260/407 |
| 3,256,304 | 6/1966 | Fischer et al. | 260/407 |
| 4,066,585 | 1/1978 | Schepp et al. | 260/18 N |
| 4,571,267 | 2/1986 | Drawert et al. | 106/27 |

FOREIGN PATENT DOCUMENTS 1243552 8/1971 United Kingdom.
1372523 10/1974 United Kingdom.

*Primary Examiner*—Harold D. Anderson
*Attorney, Agent, or Firm*—Curtis, Morris & Safford

[57] ABSTRACT

Polyamide resins, suitable for use in relief printing, produced by condensation of a dimeric fatty acid, a mixture of monocarboxylic acids, and equivalent amounts of a diamine mixture of ethylene diamine and 1,6-diaminohexane.

5 Claims, No Drawings

POLYAMIDE RESIN FROM HYDROGENATED DIMERIZED FATTY ACID

The present invention relates to certain polyamide resins adaptable to use in relief printing.

The decoration of organic and inorganic substrates in relief has been known for some time.

The original technique of applying relief-like printing to paper or cardboard, for example for book covers, promotional articles, postcards, business cards, packaging, etc., consisted in executing the raised or sunk embossing with engraved plates or with printing type on printing presses with or without color transfer. In the process, the image to be printed is preprinted in one or more colors in one or more passes and then embossed in relief.

In more recent times, a modification of this technique has been steadily gaining ground. Here, too, an image is printed on the substrate, but the embossing step is dispensed with. The relief is produced by coating the printing with a thermoplastic synthetic resin.

Technically, the process is carried out by printing the substrate by the offset method with the printing inks commonly used therewith. Immediately thereafter, a finely pulverized thermoplastic resin is sprinkled on the surface of the printing while it is still wet and tacky. The excess powder is removed by suction from the unprinted, and therefore nontacky, areas. In a heat treatment which follows, the resin is heated to a temperature above its melting point so that it flows out to form a continuous surface.

The thermoplastic resin must meet a number of requirements, the most important of these being that it should have no color of its own, or as little as possible, and that it should be grindable to a fine powder that will not block even under the conditions of use and thus remains free flowing.

Adequate adhesion to different substrates, especially paper and cardboard, good flexibility, compatibility with the primer, and nontacky, glossy surfaces are additional requirements.

The polyamide resins comprising dimerized fatty acids and ethylenediamine used up to now for this purpose meet several of these requirements but leave room for improvement with regard to their color index and resistance to discoloration. Moreover, the fatty acids required to produce them must be hydrogenated fatty acids having iodine numbers under 10; even then, during the condensation even minor amounts of atmospheric oxygen will result in appreciable deterioration of the color index.

The object of the present invention thus is to overcome these drawbacks of the prior art and to provide polyamides comprising dimerized fatty acids for use in relief printing, which polyamides are distinguished not only by good adhesion, flexibility, and water, oil, acid and alkali resistance, but also by a good color index and improved resistance to discoloration under the condition of condensation and use.

The present invention thus relates to thermoplastic polyamides for use in relief printing which are condensation products of an acid component comprising
(A) a hydrogenated dimerized fatty acid,
(B) propionic acid,
(C) acetic acid,
(D) 2-ethylhexanoic acid and/or isononanoic acid,
and an amine component comprising
(E) 1,2-diaminoethane and
(F) 1,6-diaminohexane,
wherein the ratio of equivalents of (A):[(B) plus (C) plus (D)] may range from 0.8:0.2 to 0.6:0.4, and preferably is 0.7:0.3; the equivalent amount of component (B) is 0.1 or greater, that of component (C) is 0.05 or greater, and that of component (D) is 0.025 or greater; the ratio of equivalents of components (E):(F) ranges from 0.4:0.6 to 0.6:0.4 and preferably is 0.5:0.5; and the ratio of equivalents of the components [(A)–(D)]:[(E) plus (F)] is approximately 1:1.

"Dimerized fatty acid" refers to commerical fatty acids which have been hydrogenated by known methods to iodine numbers not above about 25 and whose dimeric fatty acid content optionally has been increased to approximately 100 percent by the usual methods.

These polymerized fatty acids can be prepared by the methods known in the art (see, for example, U.S. Pat. Nos. 2,482,761 and 3,256,304) from unsaturated natural and synthetic aliphatic acids having from 12 to 22, and preferably 18, carbon atoms.

Typical polymeric fatty acids now on the market have approximately the following composition:

| Monomeric acids | 5 to 15 wt. % |
| Dimeric acids | 60 to 80 wt. % |
| Trimeric and higher-polymeric acids | 10 to 35 wt. % |

The polyamide resins of the invention can be ground even at normal temperatures to a powder that will not block and will remain perfectly free flowing without further additives even under the conditions of application. Precise and sharply defined zones can therefore be obtained even in very small printed images or images with much detail. The particle size of the powder may be varied as required and ranges from 50 to 250 microns, and preferably from 80 to 150 microns.

The melting point of the resins is adapted to practical requirements by altering the relative contents of the acids in the acid component of the polyamide in a manner known to those skilled in the art. Thus, for example, it is known that the melting point can be increased by increasing the relative content of short chain acids with respect to longer chain acids. In general, the melting point of the resins of the invention is so low that neither the substrate nor the primer is adversely affected by the melting temperatures, yet the melting point is sufficiently high that blocking will not occur even at the temperatures of application. The preferred melting range (as determined by the ring and ball method) is about 90° C. to 140° C., and preferably 100° C. to 120° C.

Furthermore, the resins have a very narrow melting range and therefore rapidly become nontacky and non-blocking during the cooling phase which follows the melting phase. This is highly desirable for achieving fast cycle times.

Moreover, the polyamides of the invention are readily compatible with the most widely used primers, so that at the melting temperatures, which should be at least 20° C. above the melting point of the polyamide, good flow of the melt is assured and with it a flawless surface after solidification.

The melting viscosities of the resins, determined throughout the application at 160° C. with a rotational plate/cone viscometer (manufactured by the Haake Company) in accordance with the manufacturer's directions, range from about 0.1 to 0.8 Pa.sec, and preferably from 0.3 to 0.6 Pa.sec.

Because of their good adhesion, especially to paper and cardboard, and of its flexibility, coatings of the resins of the invention withstand all usual stresses, as in bending or reeling, without peeling or cracking of the relief.

The resistance of the polyamides of the invention to discoloration in the presence of atmospheric oxygen, both in a melt and under conditions of use (lightfastness), coupled with negligible intrinsic color and high transparency as well as a smooth, glossy surface, makes them particularly well suited for use in relief printing. Changes in hue of the underlying printed image therefore are not likely to occur.

To achieve special effects, additives commonly employed in this field, such as flow control agents or waxes, may be used concurrently in small amounts. Depending on the composition of the polyamide, of the flow control agent and of the wax, these amounts range from about 0.1 to 5 weight percent, and preferably from 0.1 to 2 weight percent, based on the polyamide.

A better understanding of the invention and of its many advantages will be had by referring to the following specific examples.

Production of Polyamide Resins

EXAMPLE 1

250 g (0.7 equivalent) of hydrogenated dimeric fatty acid having an iodine number of 25 and a dimer content of 76.3 wt. % (monomer content, 11.2 wt. %; trimer content, 12.5 wt. %), 18.56 g (0.2 equivalent) of propionic acid, 3.76 (0.05 equivalent) of acetic acid, 10.1 g (0.05 equivalent) of isononanoic acid, 18.86 g (0.5 equivalent) of ethylene diamine, and 60.25 g (0.5 equivalent) of 1,6-diaminohexane were charged to a reactor equipped with condenser, stirrer and thermometer, flushed with nitrogen, and heated under nitrogen over 90 minutes to 230° C. This temperature was maintained for 2 hours, following which the charge was further condensed for 2 hours at 230° C. and 15 millibars. The polyamide has the following values:

| Softening point (ring and ball method) | 101° C. |
|---|---|
| Amine number | 6.5 |
| Acid number | 4.5 |
| Viscosity at 160° C. | 0.47 Pa · sec |
| Gardner color index (30% solution in 1:1 ethanol/benzene | 2-3 |

EXAMPLE 2

The same procedure was followed as in Example 1, except that the ratio of propionic acid:acetic acid::isononanoic acid was 0.225:0.05:0.0025. The polyamide has the following values:

| Softening point | 102° C. |
|---|---|
| Amine value | 5.8 |
| Acid value | 2.9 |
| Viscosity at 160° C. | 0.51 Pa · sec |
| Gardner color index | 2-3 |

EXAMPLE 3

The same procedure was followed as in Example 1, except that the composition of the dimeric fatty acid was as follows: monomeric fatty acid, 3.6 wt. %; dimeric fatty acid, 94.2 wt. %; trimeric and higher polymerized fatty acids, 2.2 wt. %. The iodine number was 15. The polyamide had the following values:

| Softening point | 104° C. |
|---|---|
| Amine value | 3.2 |
| Acid value | 1.6 |
| Viscosity at 160° C. | 0.33 Pa · sec |
| Colox index | 3 |

Testing of Polyamide Resins

A polyamide resin of the invention, produced as described in Example 1, was ground in a laboratory mill and with a set of screens a particle size fraction of 150-80 microns was screened out. A blue pigmented high viscosity offset ink was applied to the coated (smooth) side of a light weight white cardboard (business card stock) with a handcoater in a thickness of 12 microns and after an air exposure time of from 8 to 10 second the screened powder was sprinkled onto it. Because of the sticky nature of the ink, an amount of powder sufficient for the formation of a relief adhered. The excess powder was readily removed. The cardboard so prepared was then placed on a slowly rotating metal plate and heated with infrared lamps from above at a distance of about 30 cm. After a residence time of about 5 seconds, the powder melted and flowed out to form a smooth, continuous, glossy film which solidified immediately after removal from the heating zone. Since the polyamide resin had practically no color of its own, no change was observable in the blue hue of the printing ink. Moreover, the polyamide film had sharply defined boundaries which corresponded exactly to the printed image.

In a mandrel bending test (diameter of mandrel, 5 mm), no peeling was observable. Also, none of the typical defects of relief prints, such as poor flow, inhomogeneities, or crater formation, be observed during examination with a magnifying glass for evaluation of the surface.

What is claimed is:

1. A polyamide resin, adaptable to use in relief printing, formed between an acid component comprising
   (A) a hydrogenated dimerized fatty acid,
   (B) propionic acid,
   (C) acetic acid,
   (D) at least one member selection from the group consisting of 2-ethylhexanoic acid and isononanoic acid;

and an amine comprising
   (E) 1,2-diaminoethane and
   (F) 1,6-diaminohexane, wherein the ratio of equivalents of (A):[(B) plus (C) plus (D)] is from 0.8:0.2 to 0.6:0.4; the equivalent amount of component (B) is not less than 0.1; that of component (C) is not less than 0.05; and that of component (D) is not less than 0.025; the equivalent ratio of components (E):(F) is from 0.4:0.6 to 0.6:0.4; and the ratio of equivalents of components [(A)–(D)]:[(E) plus (F)] is approximately 1:1.

2. A polyamide resin as in claim 1 wherein the equivalent ratio of components (A):[(B) plus (C) plus (D)] is 0.7:0.3.

3. A polyamide resin as in claim 1 wherein the equivalent amount of component (B) is 0.2 and the equivalent amounts of components (C) and (D) are each 0.05.

4. A polyamide resin as in claim 1 wherein components (E) and (F) are present in an equivalent ratio of 0.5:0.5.

5. A polyamide resin as in claim 1 wherein said hydrogenated dimerized fatty acid has a dimer content between 70 and 96 percent by weight and an iodine number not over 25.

* * * * *